(12) United States Patent
Carvajal et al.

(10) Patent No.: US 9,732,592 B2
(45) Date of Patent: Aug. 15, 2017

(54) ESTIMATING WELL PRODUCTION PERFORMANCE IN FRACTURED RESERVOIR SYSTEMS

(71) Applicant: Landmark Graphics Corporation, Houston, TX (US)

(72) Inventors: Gustavo Carvajal, Katy, TX (US); Vitaly Khoriakov, Calgary (CA); Andrey Flippov, Houston, TX (US); Marko Maucec, Englewood, CO (US); Arturo Diaz, Richmond, TX (US); Steven Knabe, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 298 days.

(21) Appl. No.: 14/648,852

(22) PCT Filed: Aug. 1, 2014

(86) PCT No.: PCT/US2014/049359
§ 371 (c)(1),
(2) Date: Jun. 1, 2015

(87) PCT Pub. No.: WO2016/018426
PCT Pub. Date: Feb. 4, 2016

(65) Prior Publication Data
US 2016/0259088 A1  Sep. 8, 2016

(51) Int. Cl.
*E21B 43/26* (2006.01)
*E21B 47/06* (2012.01)
(Continued)

(52) U.S. Cl.
CPC .......... *E21B 41/0092* (2013.01); *E21B 41/00* (2013.01); *E21B 43/26* (2013.01);
(Continued)

(58) Field of Classification Search
CPC ...... E21B 41/0092; E21B 49/00; E21B 43/26; E21B 41/00; E21B 47/06; G01V 2210/1234; G01V 2210/61
See application file for complete search history.

(56) References Cited

U.S. PATENT DOCUMENTS

| | | | |
|---|---|---|---|
| 7,953,587 B2 * | 5/2011 | Bratton | E21B 41/00 703/10 |
| 8,731,889 B2 * | 5/2014 | Du | E21B 43/267 703/10 |

(Continued)

FOREIGN PATENT DOCUMENTS

WO   2014200510 A1   12/2014

OTHER PUBLICATIONS

Cassiani, G., et al. "A Geostatistical Framework for Incorporating Seismic Tomography Auxiliary Data into Hydraulic Conductivity Estimation" J. Hydrology, vol. 206, pp. 58-74 (1998).*

(Continued)

*Primary Examiner* — Kamini S Shah
*Assistant Examiner* — Jay B Hann
(74) *Attorney, Agent, or Firm* — Polsinelli PC (57) ABSTRACT

Systems and methods for estimating well production performance in fractured reservoir systems using real-time down-hole temperature and stress information from advanced monitoring techniques.

20 Claims, 9 Drawing Sheets

(51) Int. Cl.
E21B 41/00 (2006.01)
E21B 49/00 (2006.01)
(52) U.S. Cl.
CPC .............. *E21B 47/06* (2013.01); *E21B 49/00* (2013.01); *G01V 2210/1234* (2013.01); *G01V 2210/61* (2013.01)

(56) References Cited

U.S. PATENT DOCUMENTS

| | | |
|---|---|---|
| 2004/0176911 A1 | 9/2004 | Bratton et al. |
| 2011/0042080 A1 | 2/2011 | Birchwood et al. |
| 2011/0120706 A1 | 5/2011 | Craig |
| 2011/0257944 A1 | 10/2011 | Du et al. |
| 2012/0310613 A1 | 12/2012 | Moos et al. |
| 2014/0182844 A1* | 7/2014 | Wutherich .............. E21B 43/26 166/250.02 |
| 2015/0025858 A1* | 1/2015 | Kulkarni ................. E21B 43/26 703/2 |
| 2015/0204174 A1* | 7/2015 | Kresse .................... E21B 43/26 166/250.01 |
| 2015/0362623 A1* | 12/2015 | Miotti .................. G01V 99/005 702/14 |

OTHER PUBLICATIONS

Commissioner; International Search Report and the Written Opinion of the International Searching Authority; PCT/US14/49359 May 1, 2015; 11 pgs.; ISA/KR.

* cited by examiner

ESTIMATING WELL PRODUCTION PERFORMANCE IN FRACTURED RESERVOIR SYSTEMS

CROSS-REFERENCE TO RELATED APPLICATIONS

This application and PCT/US2013/045958, which is incorporated by reference, are commonly assigned to Landmark Graphics Corporation. This application claims the priority of PCT Patent Application No. PCT/US2014/049359, filed on Aug. 1, 2014, which is incorporated herein by reference.

STATEMENT REGARDING FEDERALLY SPONSORED RESEARCH

Not applicable.

FIELD OF THE DISCLOSURE

The present disclosure generally relates to systems and methods for estimating well production performance in fractured reservoir systems. More particularly, the present disclosure relates to estimating well production performance in fractured reservoir systems using real-time down-hole temperature and stress information from advanced monitoring techniques.

BACKGROUND

Well production performance is commonly estimated using well known steady state techniques and a well model based on a nodal analysis that often needs to be calibrated using a transient build up test, a draw-down test and/or a production logging test. In this manner, real-time pressure could be used to try and match the pressure in the well model. This approach is broadly accepted, has been used for many years and works well for reservoirs/wells that produce without requiring stimulation techniques such as fracturing and acidizing. In the last 10 years, reservoirs with a permeability of less than 1 and have generated much interest due to an abundance of hydrocarbons deposited in tight rocks. However, these resources need the assistance of multiple hydraulic fracture stages to be economically produced and often require more than two fracture stages per well. In a tight reservoir system, the wells are drilled with extensive lateral sections often that operators can fracture. Conventional estimation of well production performance thus, may be undesirable due to the fact that a well requires stimulation techniques and because real-time pressure is the only parameter used to test the well model. Moreover, the challenge with wells that require stimulation techniques is to estimate the production performance of each individual fracture at any particular time (e.g. real-time, right time, on-demand, daily, weekly).

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for estimating well production performance in fractured reservoir systems using real-time down-hole temperature and stress information from advanced monitoring techniques.

In one embodiment, the present disclosure includes a method for identifying poor fracture conductivity in fractured reservoir systems to use in refracturing, which comprises: a) sampling an average effective fracture length from a distribution of average effective fracture lengths; b) selecting current pressure and temperature profiles over a length of each fracture stage; c) performing history matching to determine a misfit using the current pressure and temperature profiles, the distribution of average effective fracture lengths, the sampled average effective fracture length and a computer processor; d) updating a static well model using the current pressure and temperature profiles, the distribution of average effective fracture lengths and the sampled average effective fracture length for the static well model; e) calculating a fracture conductivity for each fracture stage; f) selecting pressure and temperature profiles for a predetermined period of time over the length of each fracture stage; g) performing history matching using at least one pressure and temperature profile from the pressure and temperature profiles selected for the predetermined period of time, the distribution of any effective fracture lengths, the sampled average effective fracture length and the computer processor; h) updating the updated static well model, which represents a new updated static well model, using the at least one pressure and temperature profile from the pressure and temperature profiles, selected for the predetermined period of time, the distribution of average effective fracture lengths and the sampled average effective fracture length for the updated static well model; i) calculating a Reynolds number for each fracture stage based on the new updated static well model; and j) identifying the fracture and each fracture stage to determine poor fracture conductivity using at least one of the fracture conductivity and the Reynolds number calculated for each fracture stage.

In another embodiment, the present disclosure includes a non-transitory program carrier device tangibly carrying computer-executable instructions for identifying poor fracture conductivity in fractured reservoir systems to use in refracturing, the instructions being executable to implement: a) sampling an average effective fracture length from a distribution of average effective fracture lengths; b) selecting current pressure and temperature profiles over a length of each fracture stage; c) performing history matching to determine a misfit using the current pressure and temperature profiles, the distribution of average effective fracture lengths, the sampled average effective fracture length; d) updating a static well model using the current pressure and temperature profiles, the distribution of average effective fracture lengths and the sampled average effective fracture length for the static well model; e) calculating a fracture conductivity for each fracture stage; f) selecting pressure and temperature profiles for a predetermined period of time over the length of each fracture stage; g) performing history matching using at least one pressure and temperature profile from the pressure and temperature profiles selected for the predetermined period of time, the distribution of any effective fracture lengths, the sampled average effective fracture length; h) updating the updated static well model, which represents a new updated static well model, using the at least one pressure and temperature profile from the pressure and temperature profiles, selected for the predetermined period of time, the distribution of average effective fracture lengths and the sampled average effective fracture length for the updated static well model; i) calculating a Reynolds number for each fracture stage based on the new updated static well model; and j) identifying the fracture and each fracture stage to determine poor fracture conductivity using at least one of the fracture conductivity and the Reynolds number calculated for each fracture stage.

In yet another embodiment, the present disclosure includes a method for identifying poor fracture conductivity in fractured reservoir systems to use in refracturing, which comprises: a) selecting acoustic profiles for a predetermined period of time over a length of each fracture stage; b) calculating a compressional velocity using at least one of the acoustic profiles; c) identifying a main lithology of an acoustic medium represented by the acoustic profiles and a related Gardner coefficient; d) calculating an effective stress using the compressional velocity and the Gardner coefficient; e) calculating a fracture conductivity for each fracture stage using the effective stress and a computer processor; and f) identifying each fracture stage with poor fracture conductivity.

In yet another embodiment, the present disclosure includes a non-transitory program carrier device tangibly carrying computer-executable instructions for identifying poor fracture conductivity in fractured reservoir systems to use in refracturing, which comprises: a) selecting acoustic profiles for a predetermined period of time over a length of each fracture stage; b) calculating a compressional velocity using at least one of the acoustic profiles; c) identifying a main lithology of an acoustic medium represented by the acoustic profiles and a related Gardner coefficient; d) calculating an effective stress using the compressional velocity and the Gardner coefficient; e) calculating a fracture conductivity for each fracture stage using the effective stress; and f) identifying each fracture stage with poor fracture conductivity.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Figure 1A:
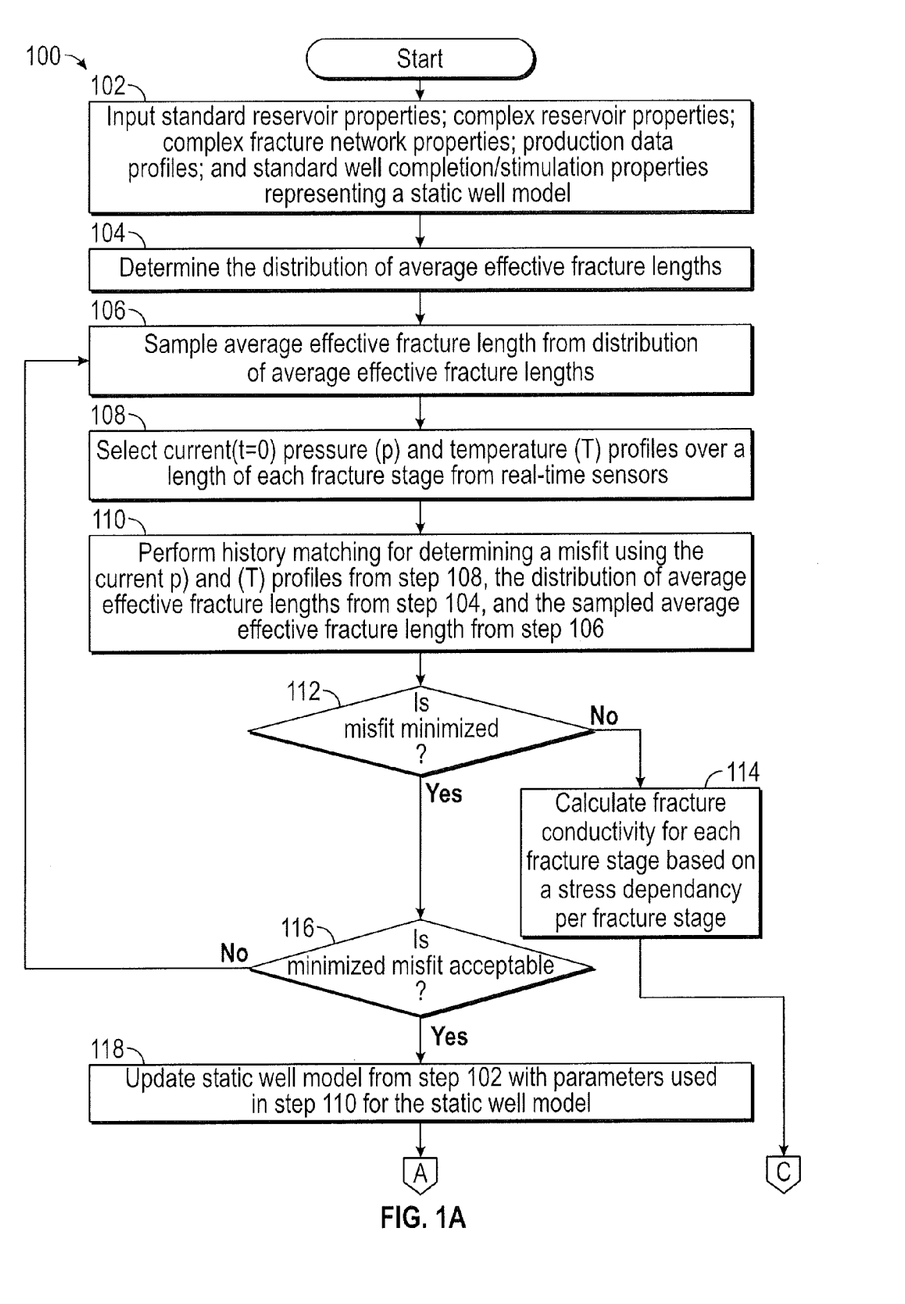
FIGS. 1A-1B is a flow diagram illustrating one embodiment of a method for implementing the present disclosure.
Figure 1B:
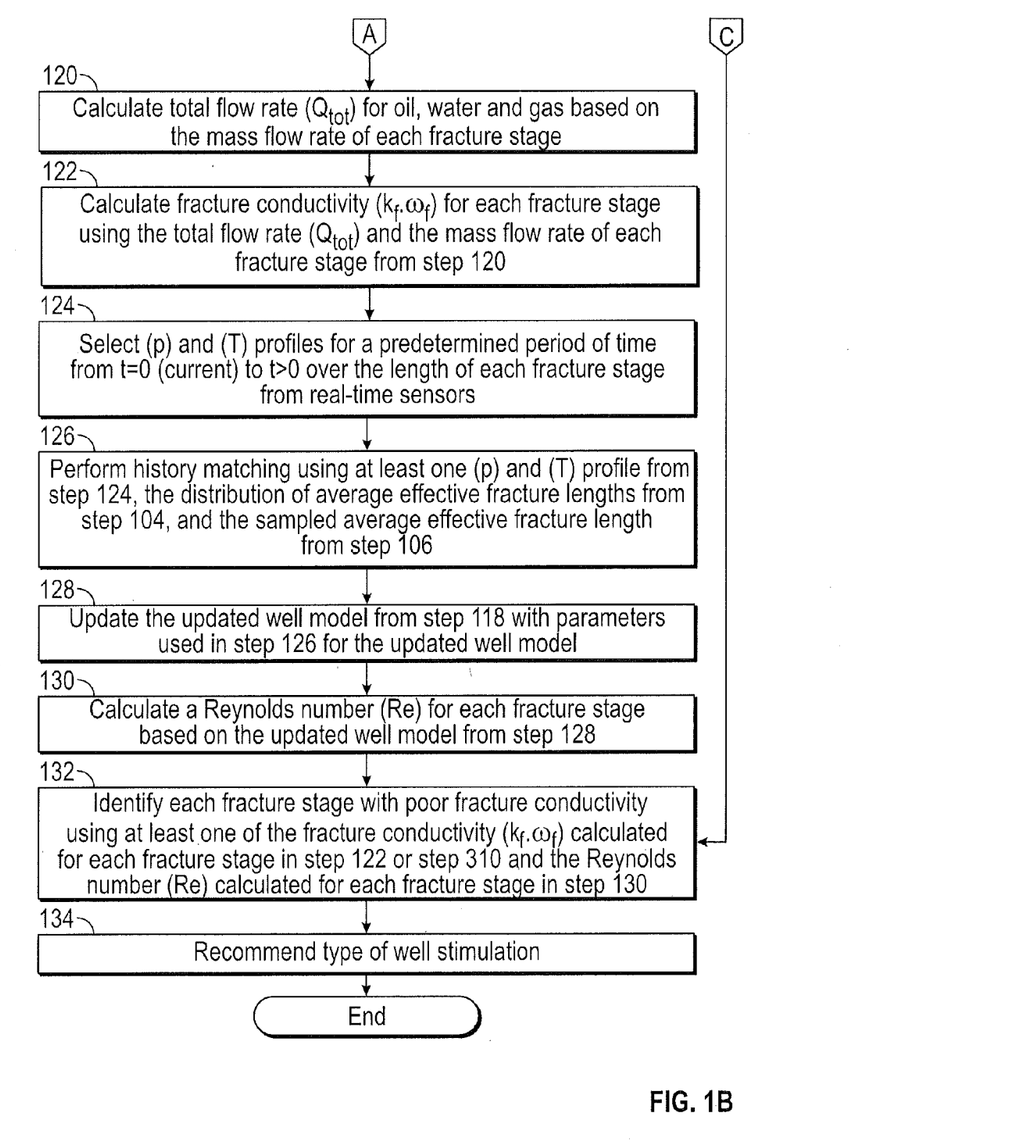

Referring now to FIGS. 1A-1B, a flow diagram illustrates one embodiment of a method 100 for implementing the present disclosure. The method 100 evaluates the production performance given for each individual fracture in a reservoir system along the well completion in terms of oil, water and gas production. Micro-seismic information is used to setup the initial fracture geometry and cluster per fracturing stage. The method 100 uses real-time information from fiber optics such as distributed temperature sensors (DTS) and down-hole pressure gauges to estimate the production performance of each fracture stage compared to the network of fractures. The method 100 also uses real-time information from fiber optics such as distributed acoustic sensors (DAS) and DTS to estimate the geo-mechanical parameters that affect the fracture geometry and thus, productivity, due to reservoir pressure depletion and bottom-hole pressure during production.

Figure 9:
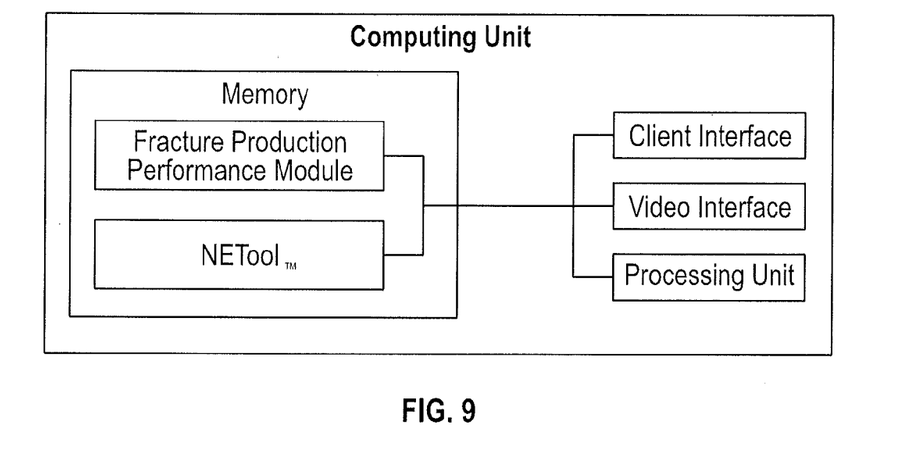
FIG. 9 is a block diagram illustrating one embodiment of a computer system for implementing the present disclosure.

In step 102, standard reservoir properties (e.g. formation thickness, bottom hole pressure (BHP), matrix porosity and permeability, rock types), complex reservoir properties (e.g. petrophysical properties (e.g. hydrocarbon content, clay content)) from advanced petrophysical well-log interpretation using mapped properties (e.g. Total Organic Carbon, porosity and brittleness) spatially distributed over the reservoir and constrained with well data), complex fracture network ("CFN") properties (e.g. data corresponding to clusters in a CFN model), production data profiles (e.g. gas/oil/water rates and BHP), and standard well completion and stimulation properties (e.g. well trajectory, well log pressure (p) and temperature (T) profiles, RP curves, Pressure Volume Temperature (PVT) fractured intervals, micro-seismic data, number of fractured stages, initial distribution of average effective fracture lengths, sampled average effective fracture length and the initial fracture conductivity per stage) hereinafter referred to as a static well model are input into a single well reservoir simulator using the client interface and/or the video interface described further in reference to FIG. 9. Clusters provide a much more accurate representation of the fracture system because fracking produces not only an elongated bi-wing fracture but rather, a network of smaller complex fractures that are preferably all interconnected and communicate between each other that form a CFN. Each CFN is impacted by other rock properties such as, for example, the standard reservoir properties and the mapped properties mentioned hereinabove.

In step 104, the distribution of average effective fracture lengths is determined. One embodiment of a method for performing this step is described further in reference to FIG. 3.

In step 106, the average effective fracture length is sampled from the distribution of average effective fracture lengths (discrete or continuous) determined in step 104. Any well-known standard probabilistic sampling technique (e.g. random sampler) may be used for sampling. In this manner, uncertainty maps of estimated improved permeability (kimp) can be generated with lower median and higher probability scenarios (e.g. P10, P50 and P90 models).

In step 108, current (t=0) pressure (p) and temperature (T) profiles over a length of each fracture stage are selected from real-time sensors using the client interface and/or the video interface described further in reference to FIG. 9.

In step 110, history matching is performed for determining a misfit by repeatedly running a simulation, which is referred to as a dynamic well model, using the current (p) and (T) profiles from step 108, the distribution of average effective fracture lengths from step 104, the sampled average effective fracture length from step 106 and techniques well-known in the art for comparing these parameters to the same parameters for the well model from step 102. The history matching result represents a misfit, as a percentage deviation, between the current (p) and (T) profiles from step 108 and the (p) and (T) profiles from the well model in step 102.

In step 112, the method 100 determines if the misfit from step 110 is minimized compared to the misfit determined in the last iteration of step 110. The first iteration of step 110 (i.e. the first determined misfit) cannot be compared to another misfit and thus, represents a minimized misfit. If the misfit is minimized, then the method 100 proceeds to step 116. If the misfit is not minimized, then the method 100 proceeds to step 114.

In step 114, the fracture conductivity for each fracture stage is calculated based on a stress dependency per fracture stage. One embodiment of a method for performing this step is described further in reference to FIG. 3

In step 116, the method 100 determines if the minimized misfit from step 110 is acceptable. Acceptable is preferably 10% deviation or less, however, may be some other predetermined deviation. If the minimized misfit is not acceptable, then the method 100 returns to step 106. If the minimized misfit is acceptable, then the method 100 proceeds to step 118.

In step 118, the static well model from step 102 is updated with the parameters used in step 110 for the static well model using techniques well known in the art.

In step 120, a total flow rate ($Q_{tot}$) is calculated for oil, water and gas, based on the mass flow rate of each fracture stage, using techniques well known in the art. The transient distribution of water, gas or oil in the stimulated volume is represented by equation 1 and equation 2 represents the flow of each under the Darcy law:

$$\frac{\partial \varphi \rho_\alpha S_\alpha}{\partial t} = \sum_{i=1}^{2} \frac{\partial}{\partial x^i}(\rho_\alpha u_\alpha^i) \quad (1)$$

$$u_\alpha^i = -\frac{1}{\mu_\alpha} k_\alpha \left(\frac{\partial p_\alpha}{\partial x^i} - \rho_\alpha g_i\right) \quad (2)$$

$$x^1 = x; x^2 = z$$
$$(x, z) \in \Gamma_i : p_\alpha = p_\alpha^i(x)$$
$$(x, z) \in \Omega_i : p_\alpha = p_\alpha^B$$

where $\varphi$ is the formation porosity; $g_i$ are the components of the gravity vector; u is the flow velocity, index $\alpha$ refers to the properties of the $\alpha$-th phase; $p_\alpha$ is the pressure; $\rho_\alpha$ is the density; $S_\alpha$ is the fluid saturation; $k_\alpha$ is the permeability; $\mu_\alpha$ is the viscosity; $p_\alpha^i(x)$ is the pressure in the fracture $\Gamma_i$ at coordinate x; and $p_\alpha^B$ is the fixed phase pressure at the domain boundary $\Omega$. For liquid-gas multiphase flow compressibility, densities and viscosities may be taken from any well-known PVT table and the remaining variables are taken from the static well model. After finding the distribution of pressure in the computation domain, the fluid mass flux rate density $J_i$ to the i-th individual fracture can be determined for each fracture stage using equation 3:

$$J_i(x) = \frac{u_\alpha^i}{A} = \frac{k_f \rho_f}{\mu_f}\left[\left(\frac{\partial p}{\partial z}\right)_+ - \left(\frac{\partial p}{\partial z}\right)_-\right] \quad (3)$$

Figure 6:
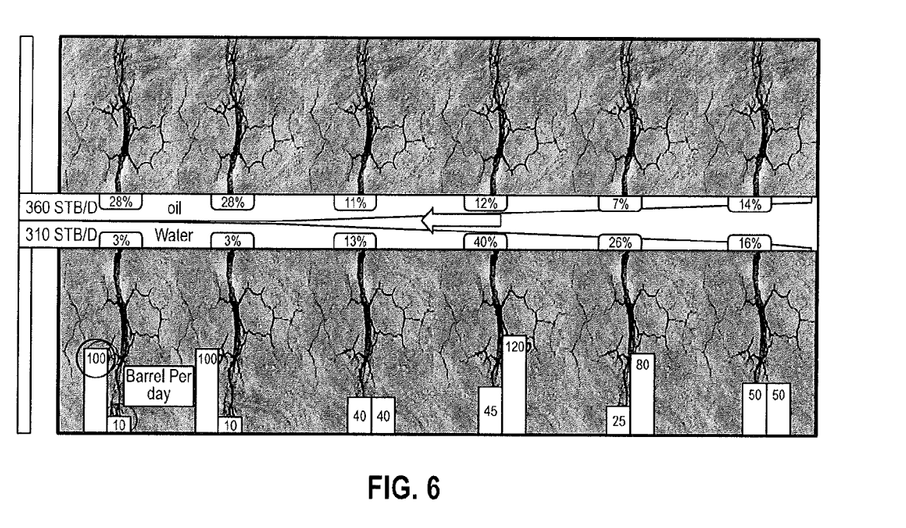
FIG. 6 is a diagram illustrating exemplary results for the water and oil flow contributions for each fracture stage at a steady state condition calculated in step 120.

These fluxes will be used to calculate the distribution of flow pressure $p_f$ inside individual fractures according to equation 4:

$$\frac{\partial}{\partial x}\left(\frac{\rho_f h k_p}{\mu_f}\frac{\partial p_f}{\partial x}\right) = J_i(x) \quad (4)$$

where $\rho_f$ and $\mu_f$ are the density and viscosity of the mixture, respectively; $k_p$ is the fracture permeability and h is pay or layer thickness in ft. from the static well model. Fluid density and viscosity are taken from any well-known PVT table and fracture permeability is taken from fracture treatment already setup in the static well model. Fluid velocity is taken from the output of the dynamic well model, Under Darcy law, fracture productivity can be calculated using equation 5:

$$Q_x^1 = J_i(x)*(P_e - P_f) \quad (5)$$

where: $Q_x$ is the mass flow rate for the fracture stage x; $J_i(x)$ is the mass flux from equation 4; $P_e$ is the reservoir pressure in psi from current pressure data in the dynamic well model; and $p_f$ is flowing bottom-hole pressure in psi from current pressure data in the dynamic well model. The total flow rate ($Q_{tot}$) for oil, water and gas may be calculated using equation 6:

$$Q_{tot} = Qx_1 + Qx_2 + Qx_3 + Qx_{n+1} \text{ for oil, water and gas} \quad (6)$$

where $Q_{xn}$ is the mass flow rate of each fracture stage and the contribution ratio per fracture stage is $Q_{xn}/Q_{tot}$. In FIG. 6, the diagram illustrates exemplary results for the water, oil and gas flow contribution ratios ($Q_{xn}/Q_{tot}$) as a percentage for six (6) different fracture stages at a steady state condition.

In step 122, fracture conductivity (kf·wf) is calculated for each fracture stage using the total flow rate ($Q_{tot}$) for oil, water and gas from step 120, the mass flow rate of each fracture stage ($Q_{xn}$) from step 120 and techniques well known in the art. Assuming bilinear flow into the fracture and no flow between the reservoir and exposure zone with wellbore (only fractures), a rectangular fracture of constant width, the production may be obtained using equation 7:

$$Q_x/(P_e - p_f) = 0.00113 * k_f * \omega_f * h_f/(Bo * \mu_o * (X_f + S_f)) \quad (7)$$

where $k_f$ is proppant fracture conductivity at closure stress during the treatment in millidarcy (md) from the static well model; $\omega_f$ is fracture width from fracture design or well test, if available, in ft from the static well model; $X_f$ is half fracture length in ft from micro seismic in the static well model; hf is fracture height from micro seismic in ft from the static well model; $S_f$ is skin generated by fracture (dimensionless) from the static well model; Bo is fluid formation volume factor from any well-known PVT table; $\mu_o$ is fluid viscosity in cP from any well-known PVT table; $P_e$ is the reservoir pressure in psi from current pressure data in the dynamic well model; and $p_f$ is flowing bottom-hole pressure in psi from current pressure data in the dynamic well model. Therefore fracture conductivity ($k_f \cdot \omega_f$) can be calculated by equation 8:

$$k_f^* \omega_f = Q_x B o^* \mu_o^* (X_f + S_f) / \{0.00113^{**} h_f (P_e - p_f)\} \quad (8)$$

In step 124, (p) and (T) profiles for a predetermined period of time from t=0 (current) to t>0 over the length of each fracture stage are selected from real-time sensors using the client interface and/or the video interface described further in reference to FIG. 9.

In step 126, history matching is performed by running a simulation using at least one (p) and (T) profile from step 124, the distribution of average effective fracture lengths from step 104, the sampled average effective fracture length from step 106 and techniques well-known in the art for comparing these parameters to the same parameters for the updated well model from step 118. A separate simulation may be run for each (p) and (T) profile from step 124.

In step 128, the updated well model from step 118 is updated with the parameters used in step 126 for the updated well model using techniques well known in the art.

In step 130, a Reynolds number (Re) is calculated for each fracture stage based on the updated well model from step 128 using equation 9:

$$Re = \tfrac{1}{2} \mu_\alpha^* \rho_f / \{\mu_f^* R_{psd}^* (1-\phi)\} \quad (9)$$

where $U_\alpha$ is the flow velocity from the updated dynamic well model in step 118 based on equation 2; $\rho_f$ is fluid density; $R_{psd}$ is the pore radius of fracture proppant; $\phi$ is porosity of fracture proppant; and µf is fluid viscosity in cP. The variables $\rho_f$, $\mu_f$, $R_{psd}$, and $\phi$ are given by the static well model from step 102.

Figure 7:
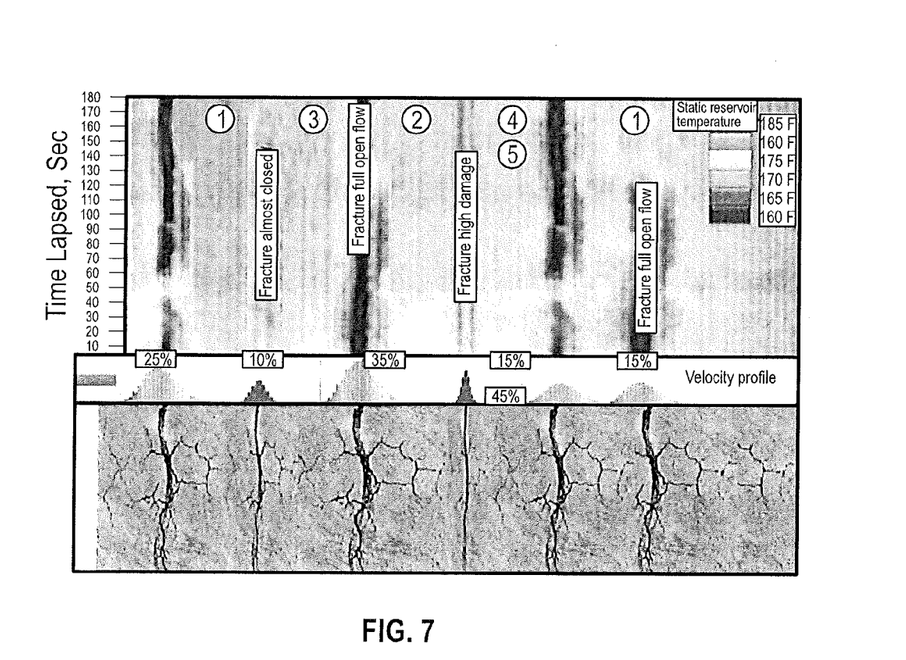
FIG. 7 is a diagram illustrating exemplary fracture stages and their fracture conductivity.

In step 132, each fracture stage with poor fracture conductivity is identified using at least one of the fracture conductivity ($k_f \cdot \omega_f$) calculated for each fracture stage in step 122 or step 310 and the Reynolds number (Re) calculated for each fracture stage in step 130. Poor fracture conductivity may be associated with a fracture conductivity that is less than 1 millidarcy-feet and/or a Reynolds number greater than 1. In FIG. 7, a diagram illustrates exemplary fracture stages and their fracture conductivity as a result of step 132. The velocity ($u_\alpha$) as a result of equation 2, static reservoir temperature from the well model in step 102, the fracture conductivity ($k_f \cdot \omega_f$) calculated in step 122 and the Reynolds number (Re) calculated in step 130 may be correlated with the following fracture patterns in FIG. 7:

Pattern 1 (fracture open and propped): a fracture is open and very well propped when $u_a$ is high, temperature is cool, $k_f w_f$ is greater than 1 millidarcy-feet and Re is less than 1.0 (laminar flow);

Pattern 2 (fracture open and non-propped): a fracture is open and not well propped when $u_a$ is high, temperature is high, $k_f w_f$ is less than 1 millidarcy-feet and Re is near 1.0 (transitional flow);

Pattern 3 (fracture almost closed): a fracture is almost closed when $u_a$ is high, temperature is very high, $k_f w_f$ is less than or equal to 1 millidarcy-feet and Re is greater than 1.0 (turbulent flow);

Pattern 4 (fracture choked): a fracture is choked when $u_a$ is low, temperature is very high, $k_f w_f$ is less than or equal to 1 millidarcy-feet and Re is less than 1; and Pattern 5 (fracture closed or simple small fissure): a fracture is closed or is a simple small fissure (micro-fracture) when $u_a$ is low, temperature is very high, $k_f w_f$ is less than or equal to 1 millidarcy-feet and Re is less than 1.

In step 134, various types of well stimulation may be recommended using the client interface and/or the video interface described further in reference to FIG. 9 based on the fracture stages identified in step 132 with poor fracture conductivity such as, for example, refracturing, fracture re-orientation, and redesign perforation.

Figure 2:
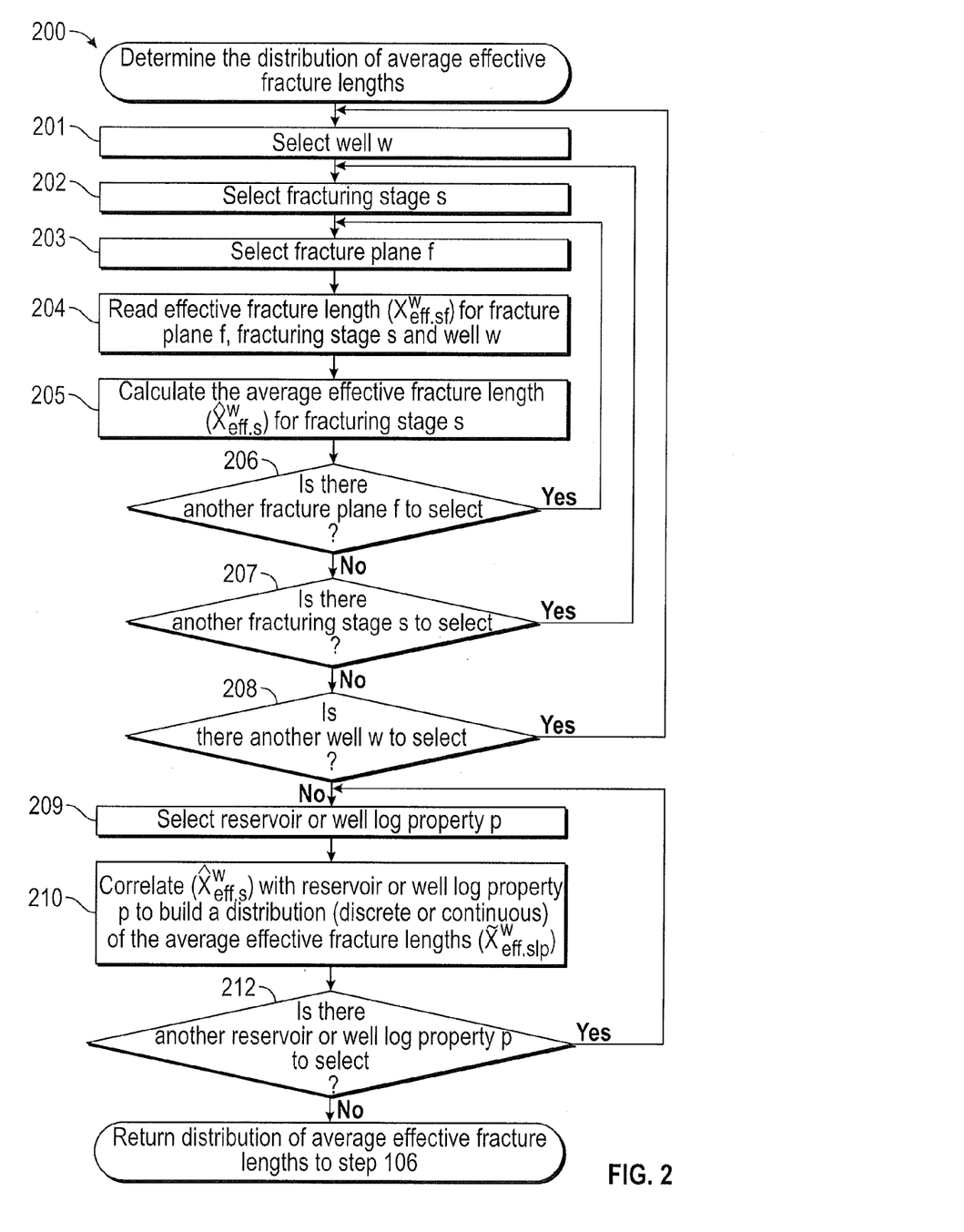
FIG. 2 is a flow diagram illustrating one embodiment of a method for performing step 104 in FIG. 1.

Referring now to FIG. 2, a flow diagram of one embodiment of a method 200 for performing step 104 in FIG. 1 is illustrated.

In step 201, a well (w) is automatically selected from a total number of wells (W) input in step 102 or, alternatively, may be selected using the client interface and/or the video interface described further in reference to FIG. 9.

In step 202, a fracturing stage (s) is automatically selected from a total number of fracturing stages (S) per well (w) input in step 102 or, alternatively, may be selected using the client interface and/or the video interface described further in reference to FIG. 9.

In step 203, a fracture plane (f) is automatically selected from a total number of fracture planes (F) per fracturing stage (s) input in step 102 or, alternatively, may be selected using the client interface and/or the video interface described further in reference to FIG. 9. It is assumed that the fracture planes (f) within each fracturing stage (s) are distributed as clusters and not the simplified single bi-wing fractures.

Figure 4A:
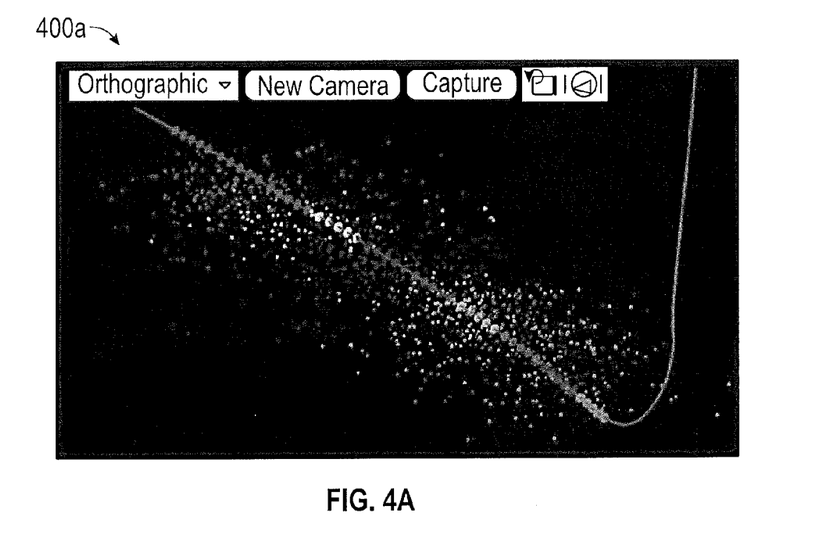
FIG. 4A is a display illustrating a collection of micro-seismic imaging events associated with a fracture cluster.
Figure 4B:
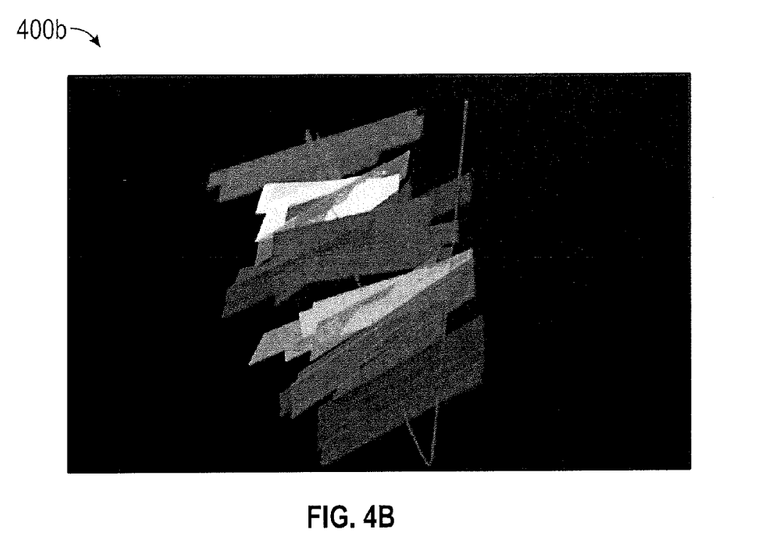
FIG. 4B is a display illustrating 3D fracture planes based on a time correlation of the micro-seismic imaging events in FIG. 4A.
Figure 5A:
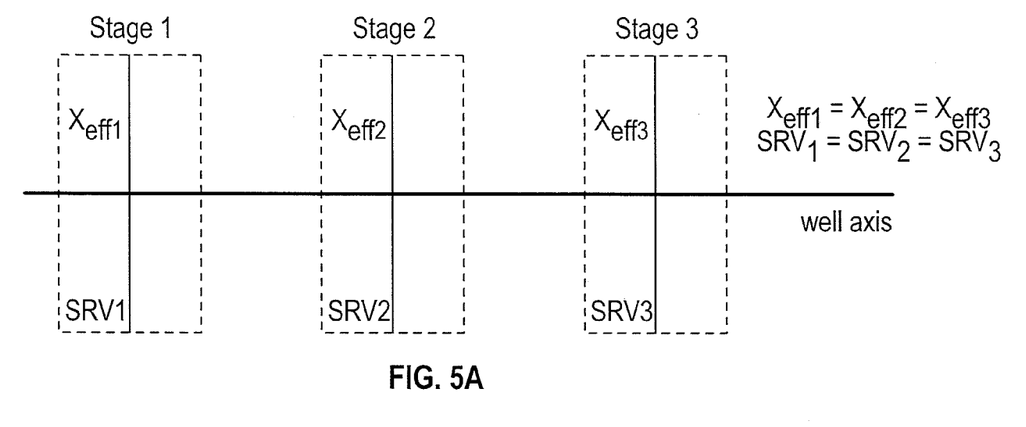
FIG. 5A is a simple schematic model of an induced fracture system illustrating bi-wing fractures with the same ($x_{eff}$), the same (SRV) and only one fracture per stage.
Figure 5B:
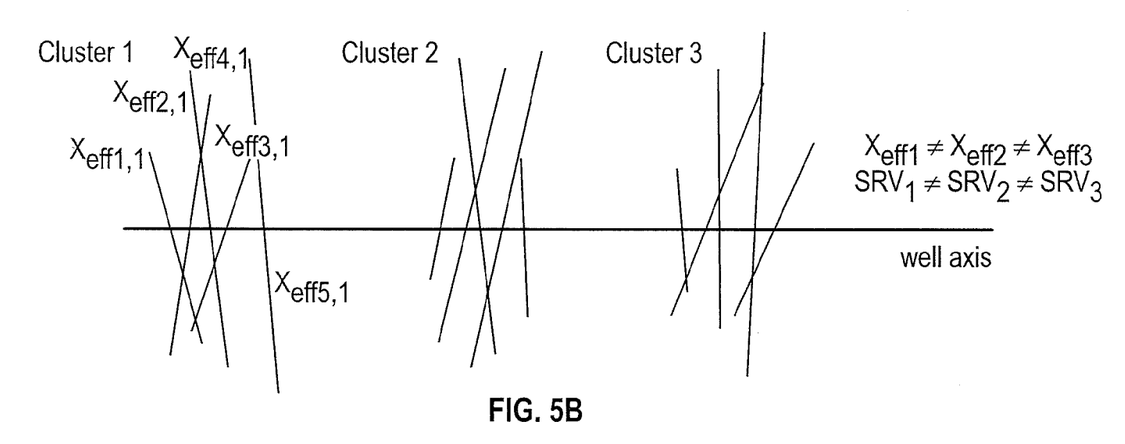
FIG. 5B is a complex schematic model of an induced fracture system illustrating multiple-complex fracture networks each with different ($x_{eff}$), different (SRV) and multiple fractures per stage.

In step 204, the effective fracture length ($x_{\mathit{eff},s,f}^w$) for the selected fracture plane (f), fracturing stage (s) and well (w) is read from the data corresponding to the CFN model input in step 102. The data corresponding to the CFN model may include, for example, the number of 3D fracture planes for a cluster per fracturing stage. The 3D fracture planes are constructed based on a temporal analysis of micro-seismic imaging events. In FIG. 4A, a display 400a of a collection of interpreted micro-seismic imaging events associated with a fracture cluster is illustrated. In FIG. 4B, a display 400b of 3D fracture planes based on a time correlation of the micro-seismic imaging events in FIG. 4A is illustrated. The 3D fracture planes in the display 400b are protruded by a well trajectory to illustrate the interpreted results of the fracking process. Based on this data input from step 102, the dimension or length of the longest axis of the selected fracture plane (f), for fracturing stage (s) and well (w) may be read and designated as the effective fracture length of that selected fracture plane (f). In FIG. 5B, a complex schematic model of an induced fracture system illustrates multiple-complex fracture networks, each with different ($x_{\mathit{eff}}$), different Stimulated Reservoir Volume (SRV) and multiple fractures per fracturing stage. As compared to the simplified model of an induced fracture system based on bi-wing fractures illustrated in FIG. 5A, the advantages of the more complex model in FIG. 5B are readily apparent in view of the much more accurate representation of the fracture system.

In step 205, the average effective fracture length ($\hat{x}_{\mathit{eff},s}^w$) for fracturing stage (s) is calculated using each effective fracture length read in step 204 and equation 10:

$$\hat{x}_{\mathit{eff},s}^w = \frac{1}{F} \sum_{f=1}^{F} x_{\mathit{eff},s,f}^w \quad (10)$$

wherein ($\hat{x}_{\mathit{eff},s,f}^w$) corresponds to the effective fracture length for selected fracture plane (f) within a selected fracturing stage (s).

In step 206, the method 200 determines if there is another fracture plane (f) to select from the total number of fracture planes (F). If there is another fracture plane (t to select, then the method 200 returns to step 203 to select another fracture plane (f) from the total number of fracture planes (F). If there is not another fracture plane (f) to select, then the method 200 proceeds to step 207.

In step 207, the method 200 determines if there is another fracturing stage (s) to select from the total number of fracturing stages (S). If there is another fracturing stage (s) to select, then the method 200 returns to step 202 to select another fracturing stage (s) from the total number of fracturing stages (S). If there is not another fracturing stage (s) to select, then the method 200 proceeds to step 208.

In step 208, the method 200 determines if there is another well (w) to select from the total number of wells (W). If there is another well (w) to select, then the method 200 returns to step 201 to select another well (w) from the total number of wells (W). If there is not another well (w) to select, then the method 200 proceeds to step 209.

In step 209, a reservoir or a well-log property (p) is automatically selected from a total number of complex reservoir properties (P) input in step 102, or, alternatively, may be selected using the client interface and/or the video interface described further in reference to FIG. 9.

In step 210, the average effective fracture length ($\hat{x}_{eff,s}^w$) for each respective fracturing stage (s) calculated in step 205 is correlated with the reservoir or well-log property (p) selected in step 209 to build a distribution (discrete or continuous) of the average effective fracture lengths ($\hat{x}_{eff,s|p}^w$). A discrete conditional distribution (histogram) may be built using equation 11:

$$\hat{x}_{eff,s|p}^w = Prob(X_{eff} = \hat{x}_{eff,s}^w \mid P = p) = \frac{Prob(P = p \cap X_{eff} = \hat{x}_{eff,s}^w)}{Prob(P = p)} \quad (11)$$

wherein "Prob" denotes "probability", ($x_{eff}$) defines the overall sampling domain of the average effective fracture length as the dependent probabilistic variable, and (P) defines the overall sampling domain of the complex reservoir property as the independent probabilistic variable. Alternatively, a continuous conditional distribution (pdf) may be built using equation 12:

$$\hat{x}_{eff,s|p}^w = Prob(X_{eff} = \hat{x}_{eff,s}^w \mid P = p) = \frac{Prob_{P,X_{eff}}(p, \hat{x}_{eff,s}^w)}{Prob_P(p)} \quad (12)$$

wherein ($Prob_{P,X_{eff}}(p,\hat{x}_{eff,s}^w)$) defines the joint density (pdf) of (P) and ($x_{eff}$), while ($Prob_p$ (p)) defines the marginal density for (P). For pdf normalization purposes it is necessary to hold $Prob_p(p)>0$.

In step 212, the method 200 determines if there is another reservoir or well-log property (p) to select from the total number of complex reservoir properties (P). If there is another reservoir or well-log property (p) to select, then the method 200 returns to step 209 to select another reservoir or well-log property (p) from the total number of complex reservoir properties (P). If there is not another reservoir or well-log property (p) to select, then the method 200 returns the distribution of average effective fracture lengths to step 106.

Figure 3:
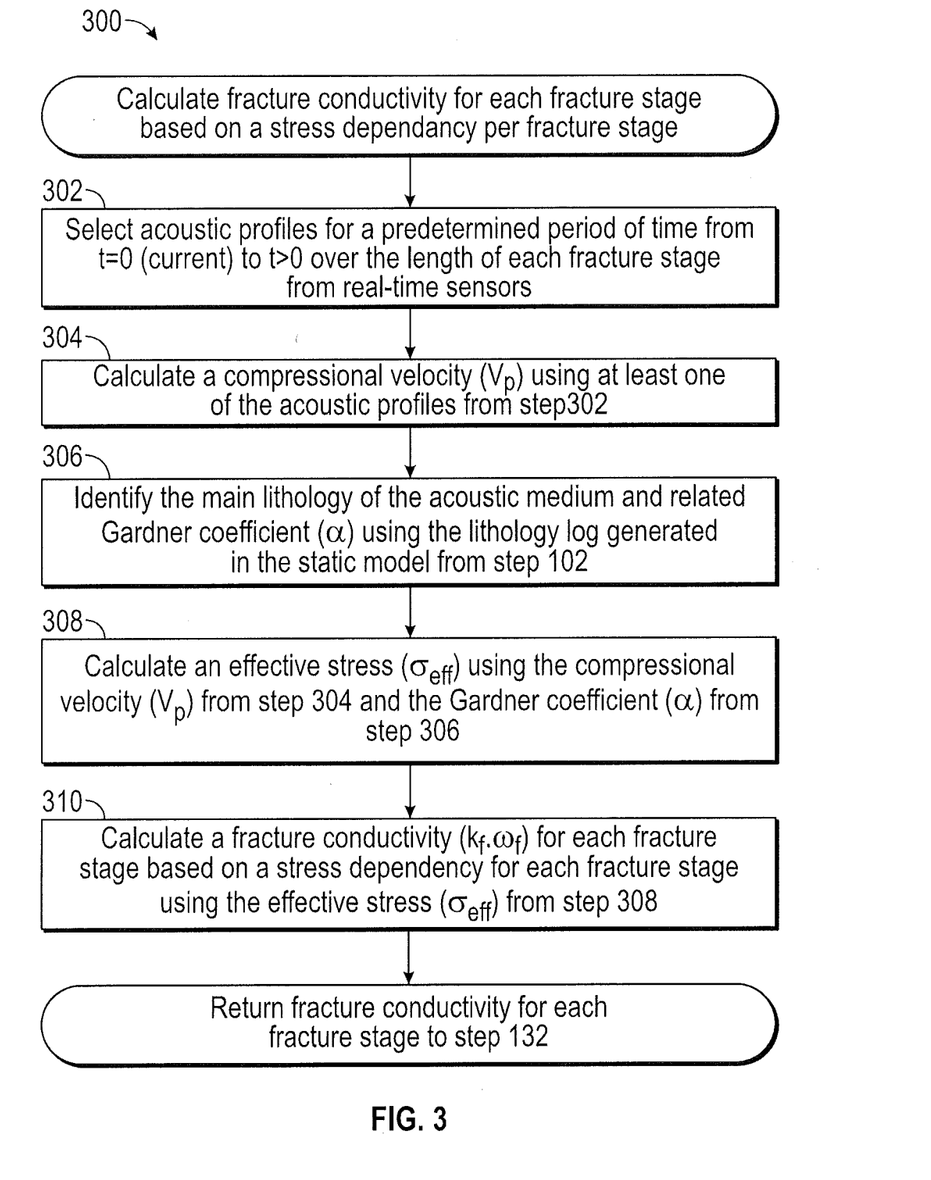
FIG. 3 is a flow diagram illustrating one embodiment of a method for performing step 114 in FIG. 1.

Referring now to FIG. 3, a flow diagram of one embodiment of a method 300 for performing step 114 in FIG. 1 is illustrated.

In step 302, acoustic profiles for a predetermined period of time from t=0 (current) to t>0 over the length of each fracture stage are selected from real-time sensors using the client interface and/or the video interface described further in reference to FIG. 9.

In step 304, a compressional velocity ($V_p$) is calculated using at least one of the acoustic profiles from step 302 and equation 13:

$$V_P = \text{frequency} \ast \text{wave-length} = f \ast \lambda \quad (13)$$

where frequency (f) and wave length ($\lambda$) are taken from the acoustic profiles.

Figure 8:
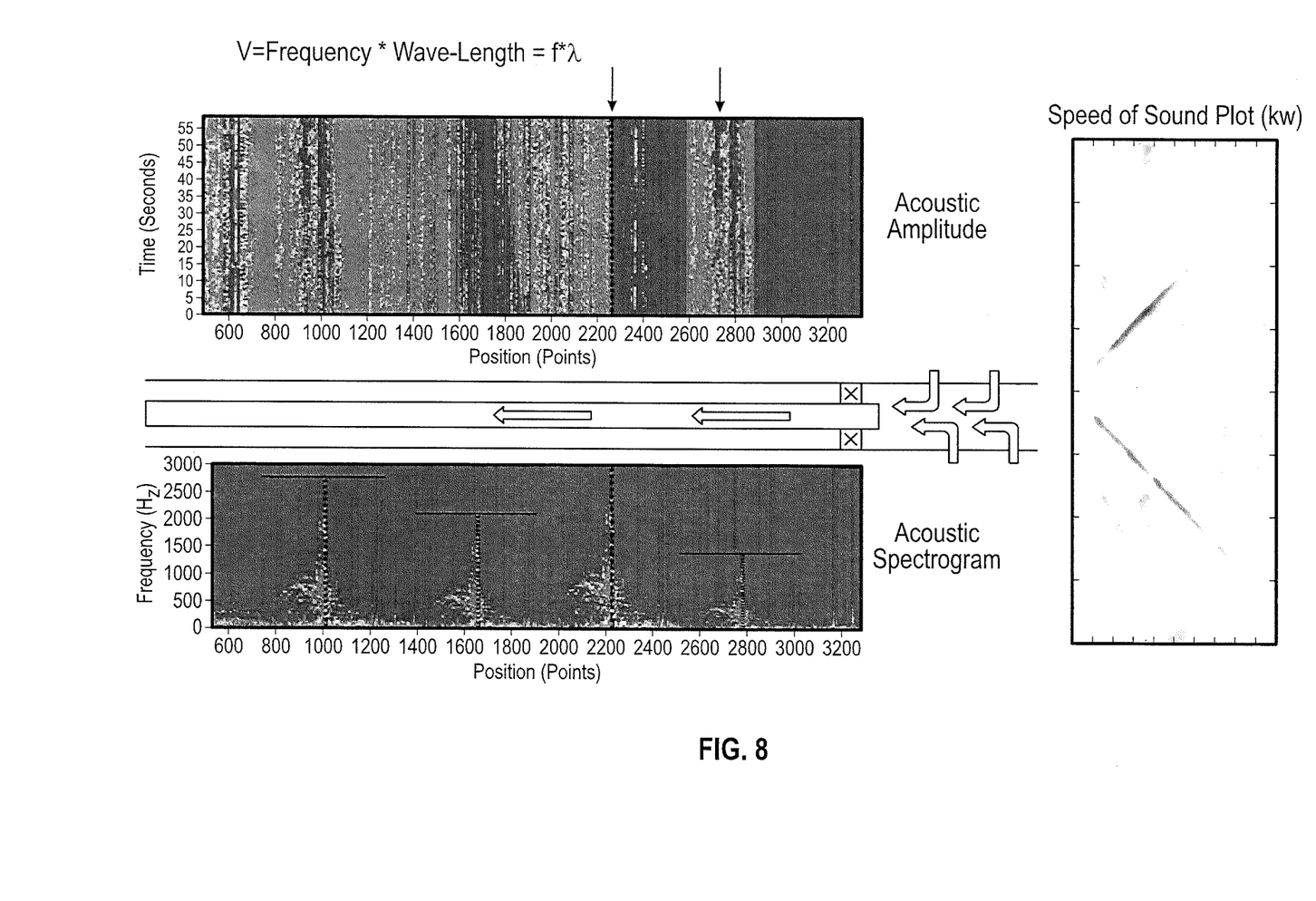
FIG. 8 is a diagram illustrating an exemplary comparison of an acoustic amplitude and acoustic spectrogram with a sound speed plot.

In FIG. 8, the diagram illustrates an exemplary comparison of an acoustic amplitude and acoustic spectrogram with a sound speed plot. The acoustic amplitude is illustrated at every second along a horizontal section showing high amplitude near the fracture face, the acoustic spectrogram illustrates frequency along the horizontal section showing a high spectrogram at the fracture face, and the sound speed plot illustrates the sound interference lines.

In step 306, the main lithology (e.g. sand, shale, carbonate, siltstone) of the acoustic medium and related Gardner coefficient (a) are identified using the lithology log generated in the static model from step 102, table 1 below and the client interface and/or the video interface described further in reference to FIG. 9. The Gardner coefficients are found in the average (mean) column and are based on data from numerous wells where both bulk density and sonic logs were measured.

TABLE 1

| Gardner Coefficient ($\alpha$) for $\beta = 0.25$ | | | | |
| --- | --- | --- | --- | --- |
| | Min | Max | mean | STD |
| Sands | 0.19418 | 0.23345 | 0.214611 | 0.003689 |
| Shale | 0.22326 | 0.31431 | 0.241292 | 0.005644 |
| Carbonates | 0.21771 | 0.24775 | 0.230706 | 0.005528 |
| Siltstone | 0.23175 | 0.26756 | 0.245668 | 0.005792 |

In step 308, an effective stress ($\sigma_{eff}$) is calculated using the compressional velocity ($V_p$) from step 304, the Gardner coefficient (a) from step 306 and techniques well known in the art. Shear velocity (Vs) can be calculated using equation 14:

$$Vs = \alpha V p^\beta \quad (14)$$

where the Gardner coefficient ($\alpha$) and $\beta$ are given by table 1 from step 306 and the compressional velocity (Vp) is from step 304. Rock density ($\rho_r$) can be calculated using equation 15:

$$\rho_r = \alpha v_p^\beta \quad (15)$$

where $\rho_r$ is rock density; Vp=compressional velocity from step 304; $\alpha$=Gardner coefficient from step 306; and $\beta$ is given by table 1 from step 306. Poisson's ratio (v) can be calculated using equation 16:

$$v = \frac{(v_p^2 - 2v_s^2)}{2(v_p^2 - v_s^2)} \quad (16)$$

where the compressional velocity ($V_p$) is from step 304 and the shear velocity ($V_s$) is from equation 14. Therefore, the effective stress ($\sigma_{eff}$) measured a time step t in front to the fracture face can be calculated using equation 17:

$$\sigma_{eff} = \left[\frac{v}{1-v}\right](\sigma_{vert} - P_p) + P_p - fBHP \qquad (17)$$

where v is the Poisson ratio from equation 16; $\sigma_{vert}$ is overburden effect or maximum vertical stress from the static well model; Pp is pore pressure or reservoir pressure (Pe) at time step t from the static well model; and fBHP or $p_f$ is flowing BHP at time step t measured in front to the fracture face (annular or tubing) from the dynamic well model.

In step 310, a fracture conductivity (kf·wf) is calculated for each fracture stage based on a stress dependency for each fracture stage using the effective stress ($\sigma_{eff}$) from step 308 and equation 18:

$$k_b w_b = k_f \cdot w_f e^{-b(\sigma_{eff} - \sigma_{eff_{init}})} \qquad (18)$$

where $\sigma_{eff\_init}$ is initial effective stress in front to fracture face after the fracture treatment from fracture treatment in the static well model; b is the coefficient permeability modulus (values go from 0.6-0.9) and $k_f$ or $k_f w_f$ are the initial (i) fracture permeability or fracture conductivity, respectively, after fracture treatment from the static well model. The fracture conductivity for each fracture stage based on a stress dependency for each fracture stage is returned to step 132 for identification of poor fracture conductivity.

The method 100 therefore, estimates well production performance over time in fractured reservoir systems using real-time down-hole information. In this manner, the method 100 can be used to identify i) the production performance of each fracture stage; ii) the closed fractures that need to be re-fractured; and iii) the fractures that generate underbalance or back-flows in the entire production profile. The method 100 can also be used to i) generate a flow regime profile; ii) generate recommendations to re-stimulate or re-fracture specific zones; iii) maximize oil sweep efficiency for each reservoir region thus, allowing a homogeneous oil drainage along the horizontal section of the well; and iv) evaluate reservoir model connectivity with fractures.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. NETool™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 9, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-8. The memory therefore, includes a fracture production performance module, which enables steps 102-108, 112-124 and 128-132 described in reference to FIGS. 1A-1B. The fracture production performance module may integrate functionality from the remaining application programs illustrated in FIG. 9. In particular, NETool™ may be used as an interface application to perform the remaining steps in FIGS. 1A and 1B. Although NETool™ may be used as an interface application, other interface applications may be used, instead, or the fracture production performance module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/non-volatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for identifying poor fracture conductivity in fractured reservoir systems to use in refracturing, which comprises:
    a) sampling an average effective fracture length from a distribution of average effective fracture lengths;
    b) selecting current pressure and temperature profiles over a length of each fracture stage;
    c) performing history matching to determine a misfit using the current pressure and temperature profiles, the distribution of average effective fracture lengths, the sampled average effective fracture length and a computer processor;
    d) updating a static well model using the current pressure and temperature profiles, the distribution of average effective fracture lengths and the sampled average effective fracture length for the static well model;
    e) calculating a fracture conductivity for each fracture stage;
    f) selecting pressure and temperature profiles for a predetermined period of time over the length of each fracture stage;
    g) performing history matching using at least one pressure and temperature profile from the pressure and temperature profiles selected for the predetermined period of time, the distribution of any effective fracture lengths, the sampled average effective fracture length and the computer processor;
    h) updating the updated static well model, which represents a new updated static well model, using the at least one pressure and temperature profile from the pressure and temperature profiles selected for the predetermined period of time, the distribution of average effective fracture lengths and the sampled average effective fracture length for the updated static well model;
    i) calculating a Reynolds number for each fracture stage based on the new updated static well model; and
    j) identifying each fracture stage with poor fracture conductivity using at least one of the fracture conductivity and the Reynolds number calculated for each fracture stage.

2. The method of claim 1, further comprising refracturing a reservoir system based on a fracture stage with at least one of the fracture conductivity less than about 1 millidarcy-feet and the Reynolds number greater than about 1.

3. The method of claim 1, further comprising repeating steps a)-c) until the misfit is acceptable.

4. The method of claim 3, wherein the misfit is minimized with each iteration of steps a)-c).

5. The method of claim 3, wherein the misfit is acceptable at less than about 10% deviation.

6. The method of claim 1, wherein the fracture conductivity for each fracture stage is calculated using a total flow rate and a mass flow rate for each fracture stage.

7. The method of claim 1, wherein the static well model is represented by standard reservoir properties, complex reservoir properties, complex fracture network properties, production data profiles and standard well completion and simulation properties.

8. A non-transitory program carrier device tangibly carrying computer-executable instructions for identifying poor fracture conductivity in fractured reservoir systems to use in refracturing, the instructions being executable to implement:
    a) sampling an average effective fracture length from a distribution of average effective fracture lengths;
    b) selecting current pressure and temperature profiles over a length of each fracture stage;
    c) performing history matching to determine a misfit using the current pressure and temperature profiles, the distribution of average effective fracture lengths, the sampled average effective fracture length;
    d) updating a static well model using the current pressure and temperature profiles, the distribution of average effective fracture lengths and the sampled average effective fracture length for the static well model;
    e) calculating a fracture conductivity for each fracture stage;
    f) selecting pressure and temperature profiles for a predetermined period of time over the length of each fracture stage;
    g) performing history matching using at least one pressure and temperature profile from the pressure and temperature profiles selected for the predetermined period of time, the distribution of any effective fracture lengths, the sampled average effective fracture length;

h) updating the updated static well model, which represents a new updated static well model, using the at least one pressure and temperature profile from the pressure and temperature profiles selected for the predetermined period of time, the distribution of average effective fracture lengths and the sampled average effective fracture length for the updated static well model;

i) calculating a Reynolds number for each fracture stage based on the new updated static well model; and j) identifying each fracture stage with poor fracture conductivity using at least one of the fracture conductivity and the Reynolds number calculated for each fracture stage.

9. The program carrier device of claim 8, further comprising refracturing a reservoir system based on a fracture stage with at least one of the fracture conductivity less than about 1 millidarcy-feet and the Reynolds number greater than about 1.

10. The program carrier device of claim 8, further comprising repeating steps a)-c) until the misfit is acceptable.

11. The program carrier device of claim 10, wherein the misfit is minimized with each iteration of steps a)-c).

12. The program carrier device of claim 10, wherein the misfit is acceptable at less than about 10% deviation.

13. The program carrier device of claim 8, wherein the fracture conductivity for each fracture stage is calculated using a total flow rate and a mass flow rate for each fracture stage.

14. The program carrier device of claim 8, wherein the static well model is represented by standard reservoir properties, complex reservoir properties, complex fracture network properties, production data profiles and standard well completion and simulation properties.

15. A method for identifying poor fracture conductivity in fractured reservoir systems to use in refracturing, which comprises:

a) selecting acoustic profiles for a predetermined period of time over a length of each fracture stage;

b) calculating a compressional velocity using at least one of the acoustic profiles;

c) identifying a main lithology of an acoustic medium represented by the acoustic profiles and a related Gardner coefficient;

d) calculating an effective stress using the compressional velocity and the Gardner coefficient;

e) calculating a fracture conductivity for each fracture stage using the effective stress and a computer processor; and f) identifying each fracture stage with poor fracture conductivity.

16. The method of claim 15, further comprising refracturing a reservoir system based on a fracture stage with at least one of the fracture conductivity less than about 1 millidarcy-feet and the Reynolds number greater than about 1.

17. The method of claim 15, wherein the main lithology of the acoustic medium is identified using a lithology log generated in a static well model.

18. A non-transitory program carrier device tangibly carrying computer-executable instructions for identifying poor fracture conductivity in fractured reservoir systems to use in refracturing, the instructions being executable to implement:

a) selecting acoustic profiles for a predetermined period of time over a length of each fracture stage;

b) calculating a compressional velocity using at least one of the acoustic profiles;

c) identifying a main lithology of an acoustic medium represented by the acoustic profiles and a related Gardner coefficient;

d) calculating an effective stress using the compressional velocity and the Gardner coefficient;

e) calculating a fracture conductivity for each fracture stage using the effective stress; and f) identifying each fracture stage with poor fracture conductivity.

19. The program carrier device of claim 18, further comprising refracturing a reservoir system based on a fracture stage with at least one of the fracture conductivity less than about 1 millidarcy-feet and the Reynolds number greater than about 1.

20. The program carrier device of claim 18, wherein the main lithology of the acoustic medium is identified using a lithology log generated in a static well model.

* * * * *